Patented Dec. 25, 1928.

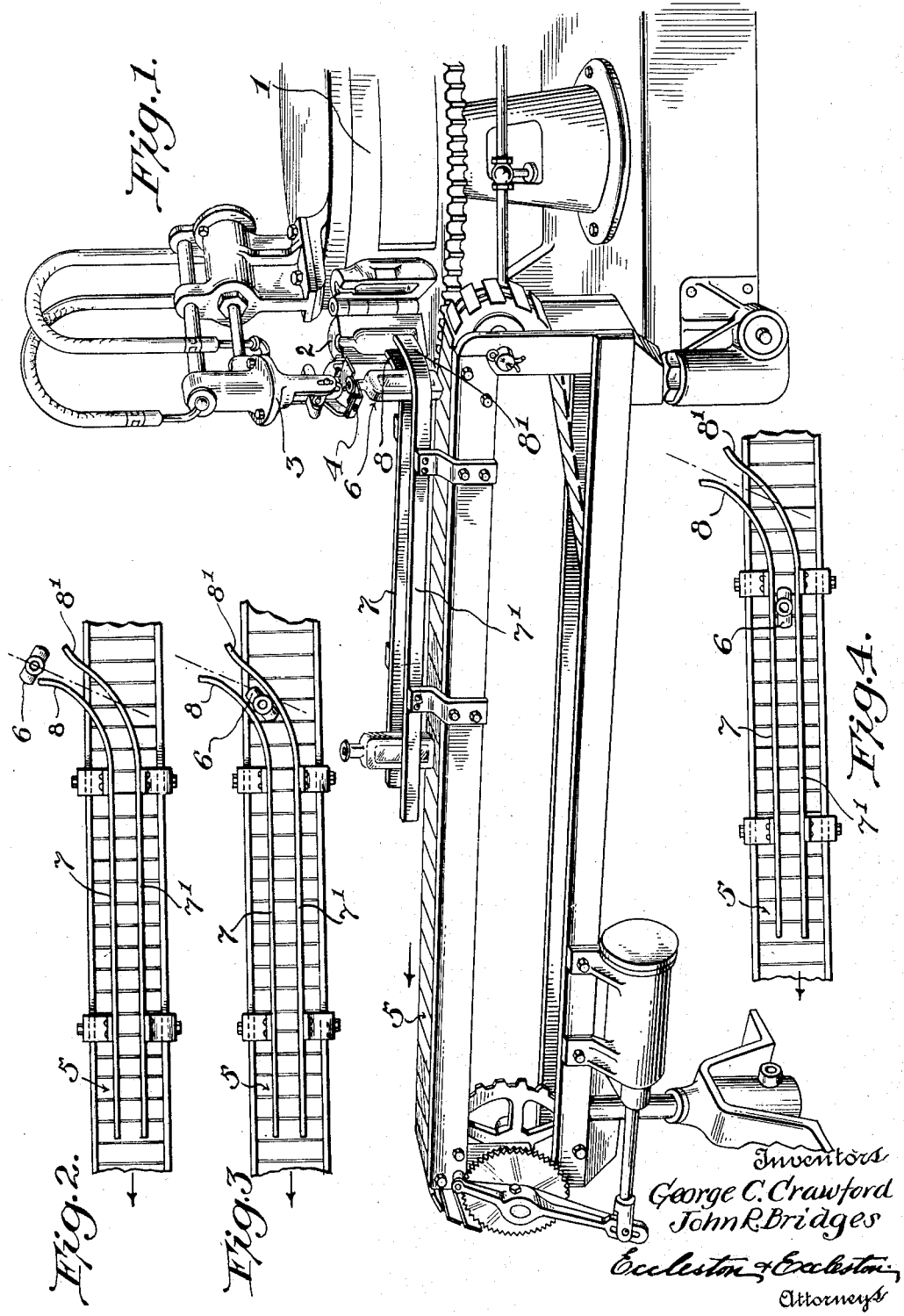

1,696,294

UNITED STATES PATENT OFFICE.

GEORGE C. CRAWFORD AND JOHN R. BRIDGES, OF ZANESVILLE, OHIO, ASSIGNORS TO HAZEL-ATLAS GLASS CO., OF WHEELING, WEST VIRGINIA, A CORPORATION OF WEST VIRGINIA.

BOTTLE-TURNING MECHANISM.

Application filed December 21, 1925. Serial No. 76,772.

It is the common practice to employ a take-out mechanism for automatically removing bottles, or other glass articles, from the molds and placing them on a conveyer leading to a leer or elsewhere. In handling rectangular or oval shaped bottles it is desirable that they be placed on the conveyer with their major axis in the direction of travel of the conveyer, so that the bottles will not be toppled over by movement of the conveyer.

In order that bottles of this type may be thus properly positioned on the conveyer it is usually necessary that they be turned through an angle of approximately 90° after they have been removed from the molds.

Prior to the present invention a take-out mechanism has been devised which turns the grippers through a certain angle during the transfer of the bottle. It is apparent, however, that a take-out mechanism must be rendered somewhat more complex if it includes, in addition to the usual mechanism for lifting and transferring the article, further mechanism for rotating the grippers through a certain angle. The object of the present invention is, therefore, to employ any simple and ordinary take-out mechanism, of which there are many types, and provide in conjunction therewith, a device of extreme simplicity for turning the bottles through the desired angle while they are suspended by the grippers, and thus eliminating the necessity of turning the grippers and consequently the mechanism for turning them.

The invention will now be described in detail, reference being had to the accompanying drawings; in which, Figure 1 is a perspective view of a take-out mechanism, a conveyer for transporting the bottles, and the device for rotating the bottles.

Figure 2 is a fragmentary plan view of the conveyer and guides, and showing a bottle about to be turned by the guide.

Figure 3 is a similar view, but showing the bottle after it has been partly turned; and Figure 4 is a similar view, but showing the bottle after it has been properly positioned on the conveyer.

Referring to the drawings more in detail, numeral 1 indicates a fragmentary part of a glass forming machine, carrying a mold 2, which is shown in open position. Numeral 3 refers generally to a take-out device, provided with a pair of grippers 4. The take-out device may be of any preferred construction, and accordingly it is not believed to be necessary or desirable to describe and illustrate in detail, any particular take-out device. The take-out device per se forms no part of the invention; it being only necessary to provide a device of this character which will grip the articles, remove them from the molds, and place them on a conveyer. The conveyer, per se forms no part of the invention, and may be of any desired type, and accordingly we have illustrated the conveyer and its operating mechanism in a more or less general manner; the conveyer being indicated by numeral 5.

Two parallel guides are arranged over a portion of the conveyer, as indicated by numerals 7, 7'; and at the end near the forming machine the guide members are curved toward the take-out device and flared as indicated by numerals 8, 8'. A rectangular shaped bottle which has been removed from the mold and is in process of being properly positioned on the conveyer, is indicated by numeral 6.

The operation of the apparatus will, no doubt, be apparent from the foregoing description, however it may be briefly described as follows:

When the mold reaches the discharging position the bottle is grasped by the grippers 4, and is then carried toward the conveyer 5 by the take-out mechanism. As the bottle is moved toward the conveyer one edge of the bottle will be intercepted by the projecting end 8 of the guide member, as clearly indicated in Figure 2, and the bottle will be turned through a certain angle. The continued movement of the take-out device will carry the bottle between the guides 8, 8', as illustrated in Figures 1 and 3, and the bottle will now be released by the grippers and be deposited on the conveyer. Upon movement of the conveyer the bottle will be carried along and will follow the curved portions of the guide members until it has been arranged on the conveyer in the desired position, that is, with its major axis in line with the direction of travel of the conveyer, as clearly indicated in Figure 4.

In this simple manner, the bottle is necessarily arranged on the conveyer in the desired angular relation; and this is accomplished with the use of any ordinary and simple take-out mechanism, without rendering such mechanism somewhat complex by having the grippers mounted for rotation and providing means for rotating them.

It is obvious, of course, that the invention is not limited to the specific guide members disclosed herein; the essence of the invention residing broadly in the provision of some means to intercept and turn the bottle or other article while it is being transported by and suspended from the take-out mechanism.

Having fully described the invention, what we claim as new and desire to secure by Letters Patent is:

1. A device of the character described, including movable means for transporting a glass article from a forming machine to a conveyer, and means arranged to intercept the glass article and turn it through a desired angle while it is held by said movable transporting means.

2. A device of the character described, including movable means for transporting a bottle from a forming machine to a conveyer, and an abutment adapted to be engaged by the bottle to turn the same through a desired angle while it is held by said movable transporting means.

3. A bottle turning mechanism including, a conveyer, a take-out apparatus for transporting a glass article from a forming machine to said conveyer, and means arranged in the path of travel of the glass article for turning it through a desired angle while it is held by said take-out mechanism.

4. A bottle turning mechanism including means for gripping and transporting a bottle, and means for turning the bottle with relation to said gripping means while held by the grippers.

5. A bottle turning mechanism including means for gripping, lifting and transporting a glass article, and means for engaging the glass article and turning the same while it is suspended by the first-mentioned means.

6. A conveyer, a take-out mechanism for grasping a glass article and transporting it to said conveyer, an element for engaging the glass article while it is being transported and turning it through an angle, and a guide member for further turning said article.

GEORGE C. CRAWFORD.
JOHN R. BRIDGES.